Aug. 31, 1943.  J. DE STEFANO  2,328,263
WINDSHIELD SAFETY GUARD
Filed March 16, 1942
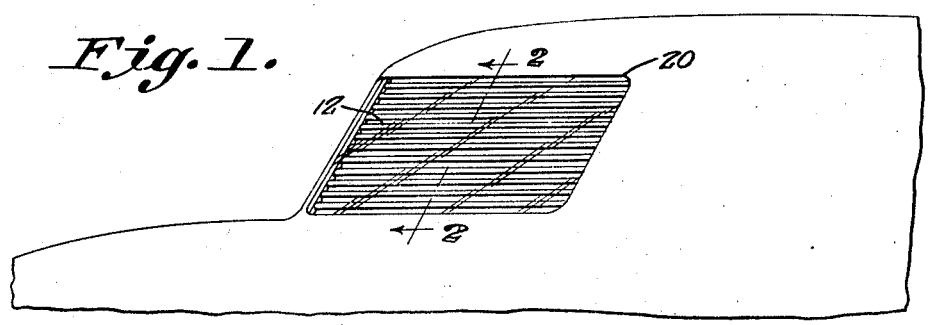
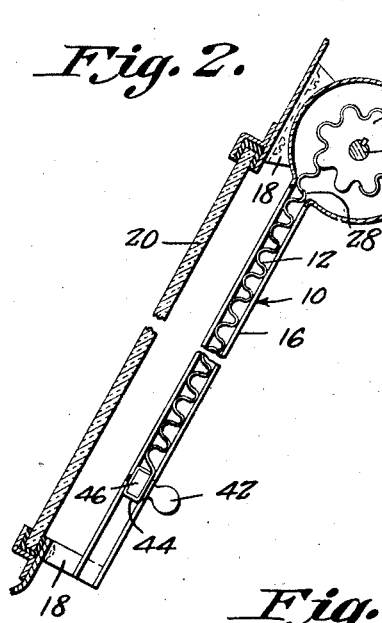
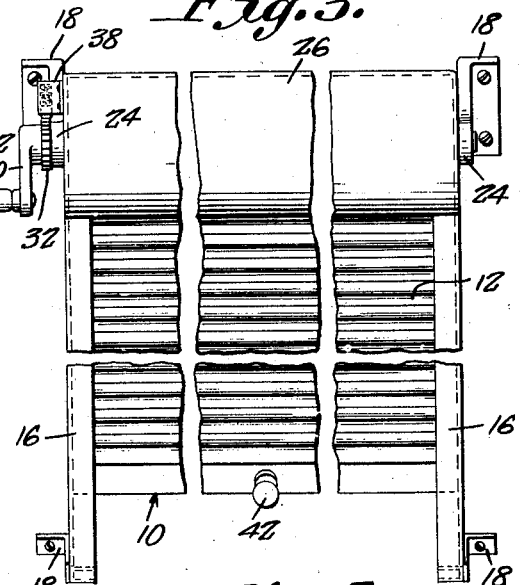
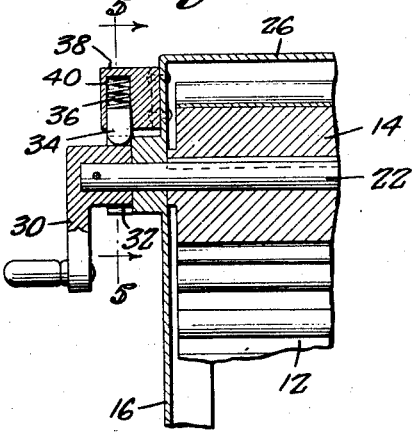
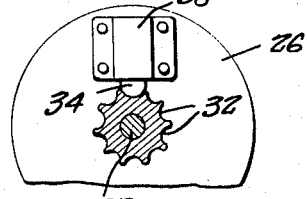
John De Stefano,
INVENTOR.
BY
Victor J. Evans & Co.
ATTORNEYS Patented Aug. 31, 1943

2,328,263

UNITED STATES PATENT OFFICE 2,328,263

WINDSHIELD SAFETY GUARD

John De Stefano, Jackson Heights, N. Y.

Application March 16, 1942, Serial No. 434,971

2 Claims. (Cl. 160—98)

My invention relates to aircraft windshields and has among its objects and advantages the provision of an improved windshield safety guard which may be easily and quickly adjusted to a position across the windshield to protect the occupants of the aircraft against the entry of foreign bodies, such as birds. The yield may also be employed as a sun visor as well as a blind flying curtain.

In the accompanying drawing:

Figure 1 is a side view of a portion of an airplane fuselage provided with a windshield, with the safety guard extending across the windshield;

Figure 2 is an enlarged sectional view along the line 2—2 of Figure 1;

Figure 3 is an inside face view;

Figure 4 is a sectional detail view of a roller latch for the roller on which the safety guard is normally wound; and Figure 5 is a view taken from the position indicated by line 5—5 of Figure 4.

In the embodiment selected for illustration, the safety guard 10 comprises a sheet of corrugated metal 12 having one end secured to a corrugated roller 14. The two side edge margins of the sheet 12 are slidably guided in channels 16 secured to the aircraft through the medium of brackets 18. The channels 16 parallel the windshield 20, lie in a common plane and are spaced a short distance inwardly of the windshield.

The roller 14 is keyed to a shaft 22 rotatably supported in bearings 24 at the ends of the roller housing 26 which is of sufficient diameter to freely accommodate the safety guard 12 when wound upon the roller 14. This housing is provided with an opening 28 through which the safety guard moves freely. The metal of the safety guard is flexible to wind easily upon the roller 14 and its corrugated formation lends strength to the safety guard to resist the impact of foreign bodies which might break through the windshield 20.

To one end of the shaft 22 is connected a crank 30 having a body 32 arranged concentrically of the shaft 22 and provided with notches 32 for selective reception of a latch pin 34. This latch pin is slidable in a bore 36 in a body 38 secured to one end wall of the roller housing 26, and the pin is yieldingly pressed against the body 32 by means of a compression spring 40.

Figures 2 and 3 illustrate the safety guard as being provided wtih a knob 42 through the medium of which the safety guard may be pulled downwardly in the channels 16. The pin 34 latches the safety guard against accidental shifting to releasably secure the safety guard in desired positions. The safety guard is wound upon the roller 14 by turning the crank 30.

The lower edge of the safety guard is bent to provide a rectangular-shaped housing 44 into which a body 46 is inserted to constitute a sturdy mount for the knob 42. The safety guard may be pulled down sufficiently far to provide complete protection against damage from a broken windshield. In addition, the safety guard may be adjusted to different positions, as when it is being used for a sun visor.

Without further elaboration, the foregoing will so fully illustrate my invention, that others may, by applying current knowledge, readily adapt the same for use under various conditions of service.

I claim:

1. A safety guard for a windshield comprising an elongated casing having a longitudinal slot, a pair of channel shaped guide members extending in parallel arrangement from opposed ends of the casing and in registration with the slot therein, a plurality of brackets for mounting the said casing and guide members in spaced relation with a windshield, a corrugated roller rotatably mounted in the housing, a corrugated guard sheet connected to the roller and having opposed longitudinal edge portions slidably engaging the said guide members, the corrugations of said guard sheet being disposed to conform to the corrugations of the roller when the sheet is wound thereon, means on the said sheet for pulling the same to extended windshield covering arrangement, and means for rotating the roller to wind the sheet thereon.

2. A safety guard for a windshield comprising an elongated casing having a longitudinal slot, a pair of channel shaped guide members extending in parallel arrangement from opposed ends of the casing and in registration with the slot thereon, a plurality of brackets for mounting the said casing and guide members in spaced relation with a windshield, a corrugated roller rotatably mounted in the housing, a corrugated guard sheet connected to the roller and having opposed longitudinal edge portions slidably engaging the said guide members, the corrugations of said guard sheet being disposed to conform to the corrugations of the roller when the sheet is wound thereon, a knob secured to the outer end margin of the sheet for pulling the latter to extended windshield covering position, a hand crank connected with the roller for manually rotating the same to wind the sheet, and means for frictionally holding the roller in adjusted position.

JOHN DE STEFANO.